(12) United States Patent
Harper et al.

(10) Patent No.: US 11,681,040 B2
(45) Date of Patent: Jun. 20, 2023

(54) MARINE MACHINE TYPE COMMUNICATION DEVICE

(71) Applicant: Siren Marine, Inc., Newport, RI (US)

(72) Inventors: Daniel A. Harper, Newport, RI (US); Phillip King Gaynor, Newport, RI (US); Dave Morschhauser, Newport, RI (US)

(73) Assignee: Siren Marine, Inc., Newport, RI (US)

( * ) Notice: Subject to any disclaimer, the term of this patent is extended or adjusted under 35 U.S.C. 154(b) by 721 days.

(21) Appl. No.: 16/547,058

(22) Filed: Aug. 21, 2019

(65) Prior Publication Data

US 2020/0064466 A1 Feb. 27, 2020

Related U.S. Application Data

(60) Provisional application No. 62/720,643, filed on Aug. 21, 2018.

(51) Int. Cl.
| | |
|---|---|
| *G01S 13/937* | (2020.01) |
| *G01S 19/01* | (2010.01) |
| *H04W 4/70* | (2018.01) |
| *H04L 67/12* | (2022.01) |
| *G01S 7/00* | (2006.01) |

(52) U.S. Cl.
CPC ............ *G01S 13/937* (2020.01); *G01S 19/01* (2013.01); *H04W 4/70* (2018.02); *G01S 7/003* (2013.01); *H04L 67/12* (2013.01)

(58) Field of Classification Search
CPC ........ G01S 13/937; G01S 19/01; G01S 7/003; H04W 4/70
See application file for complete search history.

(56) References Cited

U.S. PATENT DOCUMENTS

| | | | | |
|---|---|---|---|---|
| 6,249,241 | B1 * | 6/2001 | Jordan .................. | G01S 13/917 342/41 |
| 8,531,294 | B2 * | 9/2013 | Slavin .................. | G08B 25/008 340/568.1 |
| 8,565,100 | B2 * | 10/2013 | Jokimies ................. | H04W 4/38 370/242 |

(Continued)

FOREIGN PATENT DOCUMENTS

| | | |
|---|---|---|
| WO | 2016160853 A1 | 10/2016 |
| WO | WO-2018112661 A1 * | 6/2018 |

OTHER PUBLICATIONS

European Search Report issued in EP Application No. 18832960.1, dated Jun. 8, 2020.

(Continued)

*Primary Examiner* — Luis A Martinez Borrero
(74) *Attorney, Agent, or Firm* — Global IP Counselors, LLP

(57) ABSTRACT

The present disclosure relates to methodologies, systems, and devices for monitoring metrics associated with a marine vessel. A marine monitoring system includes a machine type communication (MTC) server; a computing device in communication with the MTC server; a user application residing on the computing device; and a marine electronic device located at a marine vessel. The marine electronic device is in communication with the MTC server, and is configured to connect to one or more wired or wireless marine sensors.

22 Claims, 10 Drawing Sheets

(56) References Cited

U.S. PATENT DOCUMENTS

| | | | | |
|---|---|---|---|---|
| 8,676,402 | B1* | 3/2014 | Foster | B63C 15/00 |
| | | | | 701/2 |
| 8,994,562 | B1* | 3/2015 | Daniel | G08B 25/009 |
| | | | | 340/984 |
| 9,123,229 | B2* | 9/2015 | Slavin | G08B 13/2491 |
| 9,135,731 | B2* | 9/2015 | Lauenstein | G06T 11/206 |
| 9,728,013 | B2* | 8/2017 | Gaynor | G01R 31/001 |
| 9,986,197 | B2* | 5/2018 | Gaynor | B63B 79/15 |
| 10,650,621 | B1* | 5/2020 | King | H04L 67/12 |
| 10,701,532 | B2* | 6/2020 | Jung | H04L 69/08 |
| 11,232,655 | B2* | 1/2022 | Bhattacharyya | |
| | | | | H04L 12/40032 |
| 11,249,176 | B2* | 2/2022 | Hooper | G01S 15/89 |
| 11,432,126 | B2* | 8/2022 | Morschhäuser | H04W 4/40 |
| 2001/0039910 | A1* | 11/2001 | Koda | G01S 7/003 |
| | | | | 114/255 |
| 2002/0158776 | A1 | 10/2002 | Lash et al. | |
| 2004/0059477 | A1 | 3/2004 | Kish et al. | |
| 2004/0075539 | A1 | 4/2004 | Savoie et al. | |
| 2004/0217900 | A1 | 11/2004 | Martin et al. | |
| 2006/0176193 | A1 | 8/2006 | Wraight | |
| 2007/0115859 | A1* | 5/2007 | Meyers | G06Q 50/28 |
| | | | | 370/254 |
| 2008/0007431 | A1 | 1/2008 | Jacques | |
| 2008/0147257 | A1* | 6/2008 | Kuhlgatz | B63B 49/00 |
| | | | | 705/1.1 |
| 2008/0246627 | A1* | 10/2008 | Guazzelli | H04Q 9/00 |
| | | | | 340/870.02 |
| 2009/0033552 | A1 | 2/2009 | Kirmuss et al. | |
| 2009/0187297 | A1* | 7/2009 | Kish | G05B 23/0213 |
| | | | | 701/21 |
| 2010/0289644 | A1* | 11/2010 | Slavin | G08B 13/2402 |
| | | | | 340/568.1 |
| 2013/0163511 | A1* | 6/2013 | Waldner | G07C 5/008 |
| | | | | 370/328 |
| 2013/0185147 | A1 | 7/2013 | Letca et al. | |
| 2014/0071167 | A1* | 3/2014 | Lauenstein | G01S 15/96 |
| | | | | 345/440 |
| 2014/0266793 | A1* | 9/2014 | Velado | B63B 79/10 |
| | | | | 340/870.16 |
| 2015/0089434 | A1* | 3/2015 | Akuzawa | B63H 25/02 |
| | | | | 715/773 |
| 2015/0369787 | A1* | 12/2015 | Stuer-Lauridsen | B63J 4/002 |
| | | | | 702/22 |
| 2016/0011863 | A1* | 1/2016 | Isaacson | H04L 67/34 |
| | | | | 717/173 |
| 2016/0012401 | A1* | 1/2016 | Coloney | G06F 8/65 |
| | | | | 705/26.81 |
| 2016/0012650 | A1 | 1/2016 | Coloney et al. | |
| 2016/0013979 | A1* | 1/2016 | Coloney | G01S 15/02 |
| | | | | 709/221 |
| 2016/0013998 | A1* | 1/2016 | Coloney | H04L 41/0816 |
| | | | | 709/224 |
| 2016/0180721 | A1* | 6/2016 | Otulic | B63H 25/02 |
| | | | | 701/2 |
| 2016/0225195 | A1* | 8/2016 | Gaynor | G07C 1/02 |
| 2016/0252906 | A1 | 9/2016 | Langford-Wood | |
| 2016/0253150 | A1 | 9/2016 | Williams et al. | |
| 2016/0260059 | A1 | 9/2016 | Benjamin et al. | |
| 2017/0019268 | A1 | 1/2017 | Lieberman et al. | |
| 2017/0126578 | A1 | 5/2017 | Amulothu et al. | |
| 2017/0238129 | A1* | 8/2017 | Maier | H04W 4/029 |
| | | | | 455/404.2 |
| 2017/0251096 | A1* | 8/2017 | Koepke | B64D 45/00 |
| 2017/0323154 | A1 | 11/2017 | Kollmann et al. | |
| 2017/0356996 | A1* | 12/2017 | Lee | H04W 24/08 |
| 2018/0004213 | A1* | 1/2018 | Absmeier | B60W 30/0956 |
| 2018/0023954 | A1 | 1/2018 | Rivers | |
| 2018/0063467 | A1* | 3/2018 | Gaynor | G11B 27/031 |
| 2018/0124557 | A1* | 5/2018 | Bartley | B63B 49/00 |
| 2018/0158340 | A1 | 6/2018 | Moura | |
| 2018/0220279 | A1* | 8/2018 | Jung | H04L 67/12 |
| 2018/0286251 | A1* | 10/2018 | Fujima | G05D 1/0206 |
| 2019/0019352 | A1* | 1/2019 | Harper | B63B 79/10 |
| 2019/0116632 | A1* | 4/2019 | Virkkala | H04L 67/535 |
| 2019/0141496 | A1 | 5/2019 | Laster et al. | |
| 2019/0147669 | A1 | 5/2019 | Park et al. | |
| 2019/0364399 | A1* | 11/2019 | Furuichi | H04Q 9/00 |
| 2020/0026417 | A1* | 1/2020 | Corbett | H04M 1/18 |
| 2020/0064466 | A1 | 2/2020 | Harper et al. | |
| 2020/0252775 | A1* | 8/2020 | Morschhauser | H04L 12/40 |
| 2020/0273268 | A1* | 8/2020 | Bhattacharyya | H04W 4/40 |
| 2020/0278433 | A1* | 9/2020 | Vanhakartano | G01S 15/93 |
| 2020/0363209 | A1* | 11/2020 | Isojärvi | G07C 5/008 |
| 2021/0129951 | A1* | 5/2021 | Kvernvik | H04W 4/00 |
| 2022/0035755 | A1* | 2/2022 | Harper | B63B 79/10 |

OTHER PUBLICATIONS

Final Office Action for U.S. Appl. No. 16/034,068 dated Dec. 22, 2020.

International Preliminary Report of Patentability and Written Opinion issued in connection with corresponding International Application No. PCT/US2018/041881, dated Jan. 14, 2020.

International Search Report & Written Opinion issued in International Application No. PCT/US2020/0044638, dated Oct. 19, 2020.

International Search Report & Written Opinion received in Application No. PCT/US2018/041881 dated Nov. 29, 2018.

Non Final Office Action for U.S. Appl. No. 16/945,693, dated Mar. 16, 2022.

Non-Final Office Action for U.S. Appl. No. 16/034,068 dated May 26, 2020.

Non-Final Office Action for U.S. Appl. No. 16/034,068 dated Oct. 18, 2021.

Office Action for U.S. Appl. No. 16/547,058 dated Mar. 24, 2022.

Australian Examination Report, AU2018301822, dated Aug. 23, 2022, 3 pages.

* cited by examiner

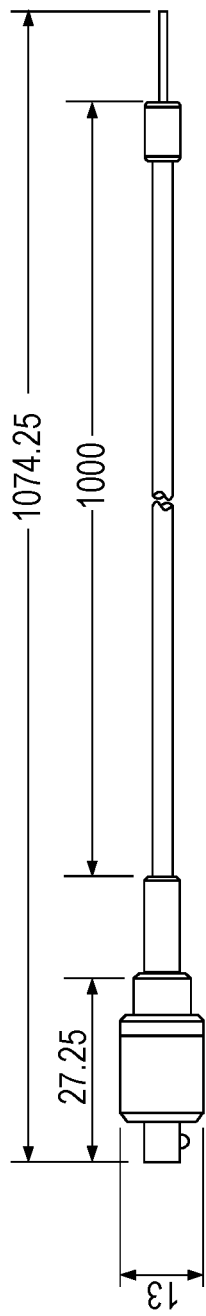
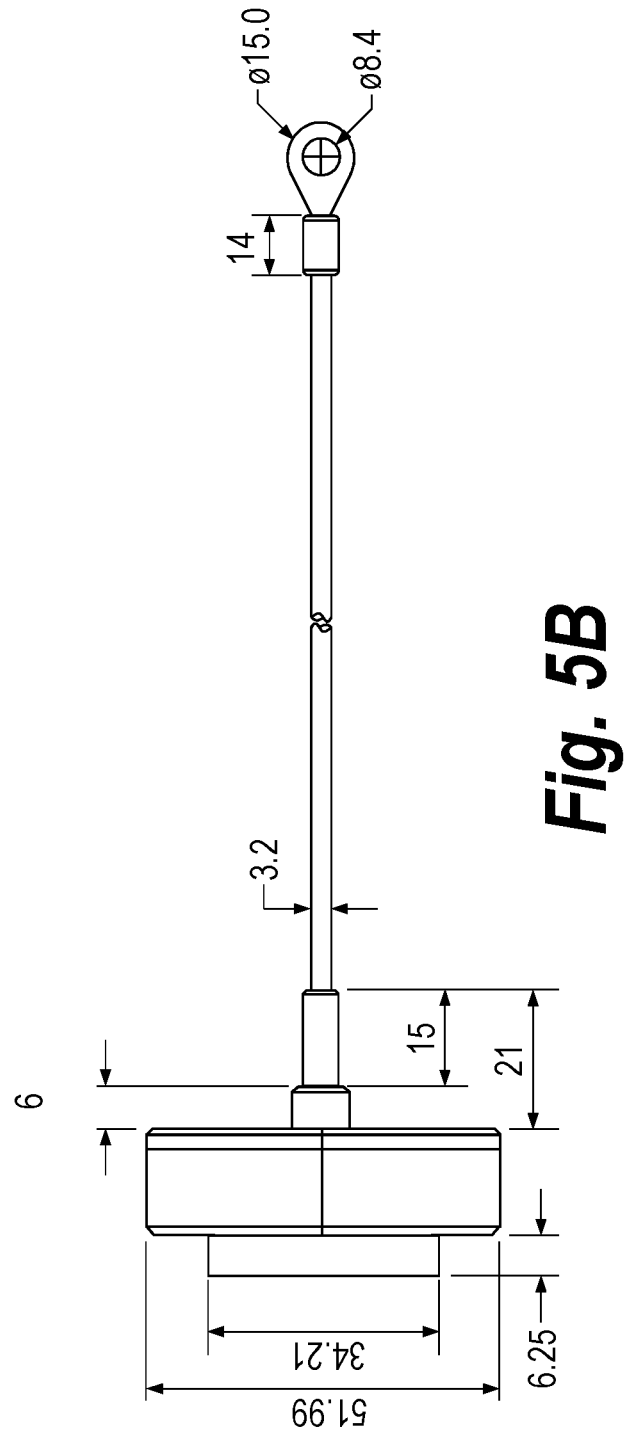

MARINE MACHINE TYPE COMMUNICATION DEVICE

FIELD OF THE TECHNOLOGY

The present disclosure generally relates to sensors, and more particularly to marine sensors and a machine type communication (MTC) device.

BACKGROUND

With a wide range of potential applications, MTC or machine-to-machine (M2M) communication is gaining a tremendous interest among mobile network operators, equipment vendors, MTC specialist companies, and research bodies.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

According to one aspect, the present disclosure relates to a system including a machine type communication (MTC) server; a computing device in communication with the MTC server; a user application residing on the computing device; and a marine electronic device located at a marine vessel. The marine electronic device is in communication with the MTC server, and is configured to connect to one or more wired or wireless marine sensors. In some embodiments, the marine electronic device includes a status LED, a digital input, a remote battery control, location technology, analog and digital outputs, a temperature sensor input, a back-up battery, an antenna, a GPS unit, a terminal connector for wired sensors, a wireless transceiver for wireless sensors, an external GPS antenna, or a satellite transceiver. In some embodiments, the wired or wireless marine sensors include a GPS position sensor, a geo-fence sensor, a battery monitoring sensor, an engine metrics sensor, a bilge sensor, a security sensor, a shore power sensor, a temperature sensor, or a remote switching sensor. In some embodiments, the user application is configured to receive user input, including geo-fencing parameters and security parameters. In some embodiments, the user application is configured to transmit an alert to a user if the marine vessel enters or leaves a designated area. In some embodiments, the marine electronic device is configured to track the location of the marine vessel, and the user application is configured to transmit an alert to a user if the anchor drags. In some embodiments, the wired or wireless marine sensors include a bilge sensor configured to monitor bilge pump activity and bilge water level. In some embodiments, the user application is configured to transmit an alert to a user if the bilge pump runs more frequently or longer than average.

According to another aspect, the present disclosure relates to a method of monitoring metrics associated with a marine vessel. The method includes monitoring one or more marine sensors associated with the marine vessel using a marine electronic device located at a marine vessel. The method also includes communicating sensor data received from the marine sensors from the marine electronic device to a remote server. The method also includes analyzing the sensor data at the remote server; and transmitting marine sensor information from the remote server to a computing device in communication with the remote server. The computing device includes a user application configured to provide the marine sensor information to a user. In some embodiments, the marine sensor information includes a notification regarding one or more of the following metrics: rotations per minute, temperature, pressure, fuel consumption, summary of alerts, alert history, fuel level, water level, bilge level, bilge pump activity, battery level, vessel security, and vessel location. In some embodiments, the user application is also configured to allow a user to provide user parameters including a geo-fence, marine sensor threshold values, marine vessel itineraries, and security parameters. In some embodiments, the remote server is also configured to analyze the sensor data according to the user-provided parameters; and the user application is configured to generate a notification if the sensor data does not conform to the user-provided parameters.

According to another aspect, the present disclosure relates to a method of monitoring metrics associated with a marine vessel comprising. The method includes reading a data bus that is in communication with a plurality of marine sensors by a marine electronic device. The method also includes generating unique data channels within the firmware of the marine electronic device corresponding to each sensor or type of sensors in communication with the data bus. The method also includes generating unique data channels within a remote server in communication with the marine electronic device corresponding to each sensor or type of sensors in communication with the data bus. In some embodiments, the data bus is an NMEA 2000 Control Area Network (CAN) based data bus. In some embodiments, the method also includes generating unique application experiences, via a user application residing on a computing device in communication with the remote server, wherein the unique application experiences correspond to each sensor or type of sensors in communication with the data bus. In some embodiments, the user application is configured to provide to a user, via a graphical user interface (GUI), indicators related to one or more of the following metrics: rotations per minute, temperature, pressure, fuel consumption, summary of alerts, alert history, fuel level, water level, bilge level, bilge pump activity, battery level, vessel security, and vessel location.

According to another aspect, the present disclosure relates to a marine electronic device including a main circuit board; a status LED; a digital input; and a remote battery control. In some embodiments, the marine electronic device also includes location technology; analog and digital outputs; and a temperature sensor input. In some embodiments, the marine electronic device also includes a back-up battery; an antenna; and a GPS unit. In some embodiments, the marine electronic device also includes a terminal connector for wired sensors; and a wireless transceiver to support sensors. In some embodiments, the marine electronic device also includes an external GPS antenna; and a satellite transceiver.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

One of ordinary skill in the art will understand that the drawings primarily are for illustrative purposes and are not intended to limit the scope of the inventive subject matter described herein. The drawings are not necessarily to scale; in some instances, various aspects of the subject matter disclosed herein may be shown exaggerated or enlarged in the drawings to facilitate an understanding of different features. In the drawings, like reference characters generally refer to like features (e.g., functionally similar and/or structurally similar elements).

FIGS. 5A-5B illustrate an exemplary temperature sensor, according to one embodiment of the present disclosure.

The features and advantages of the present disclosure will become more apparent from the detailed description set forth below when taken in conjunction with the drawings.

DETAILED DESCRIPTION

Following below are more detailed descriptions of various concepts related to, and embodiments of, methodologies, apparatus and systems for monitoring metrics associated with a marine vessel. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

As used herein, the term "includes" means includes but is not limited to. The term "including" means including but not limited to. The term "based on" means based at least in part on.

Machine Type Communications (MTC) or Machine-to-Machine (M2M) communications enable direct communications from electronic devices to a central MTC server, or a set of MTC servers. Communications can use both wireless and fixed networks, in some embodiments. MTC enables a wide range of applications in many domains, impacting different environments and markets. These communication techniques can connect a potential number of electronic devices to the Internet and other networks, forming the so-called Internet of Things (IOT).

The marine environment is harsh and poses a number of non-trivial challenges not faced by other fields. Moisture, temperature, salt, and many other marine-specific factors can damage marine electronic devices. Marine devices and sensors are also tasked with measuring and tracking numerous marine specific factors and variables.

Figure 1:
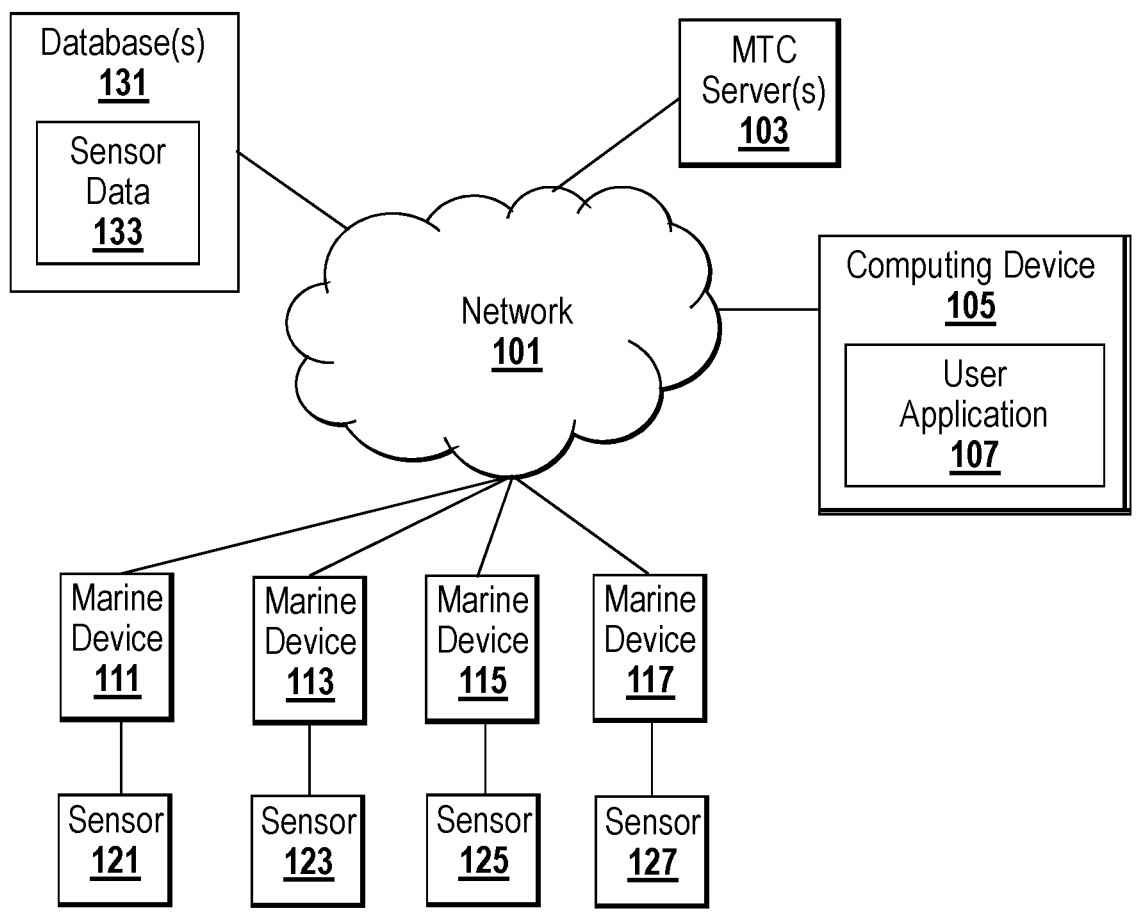
FIG. 1 illustrates a block diagram of an exemplary MTC environment, according to one embodiment of the present disclosure.

FIG. 1 illustrates a block diagram of an exemplary MTC environment, according to one embodiment of the present disclosure. This diagram illustrates how an MTC environment involves one or more entities that do not necessarily need human interaction. In this exemplary block diagram, one or more MTC servers 103 are in communication with a computing device 105, one or more electronic devices 111, 113, 115, 117, and a database 131 via a network 101. As will be appreciated, the one or more servers 103, computing device 105 and/or database 131 can be local or remote, and various distributed or centralized configurations may be implemented, and in some embodiments a single computing device or server can be used. In exemplary embodiments, the computing device 105 can include a user application 107 through which a user can communicate with the system and provide information or user input.

In exemplary embodiments, the various electronic devices 111-117 can be in communication with, or can include, one or more sensors 121-127 in order to monitor various metrics. These sensors can include, for example, GPS sensors, Geo-Fence sensors, battery monitoring sensors, engine metrics sensors, bilge sensors, security sensors, shore power sensors, temperature sensors, remote switching sensors, depth finders, environmental sensors, fluid tank sensors, etc. The one or more servers 103, computing device 105, and one or more electronic devices 111-117 can communicate with each other and with the database 131, where sensor data 133 can be stored.

In exemplary embodiments, the computing device 105 may include, but is not limited to, smart phones, tablets, netbooks, laptops, computers, general purpose computers, wireless devices, portable devices, wearable computers, cellular or mobile phones, microprocessor-based or programmable consumer electronics, game consoles, and the like. The one or more servers 103, computing device 105, and one or more electronic devices 111-117 may connect to network 101 via a wired or wireless connection. The communication network 101 may include, but is not limited to, the Internet, an intranet, a LAN (Local Area Network), a CAN (Controller Area Network), a WAN (Wide Area Network), a MAN (Metropolitan Area Network), a wireless network, an optical network, and the like. In one embodiment, the one or more servers 103, computing device 105, and one or more electronic devices 111-117 can transmit instructions to each other over the communication network 101.

The one or more servers 103 and/or computing device 105 may include one or more non-transitory computer-readable media for storing one or more computer-executable instructions (such as but not limited to software or firmware) for implementing any example method according to the principles described herein. The non-transitory computer-readable media can include, but are not limited to, one or more types of hardware memory, non-transitory tangible media (for example, one or more magnetic storage disks, one or more optical disks, one or more USB flashdrives), and the like. For example, memory included in the one or more servers 103 and/or computing device 105 can store computer-readable and computer-executable instructions or software for implementing exemplary embodiments and programmed to perform processes described herein.

In exemplary embodiments, the user application 107 enables an MTC user to activate a geo-fence and receive position updates in the event the boat is moved or stolen. A customizable geo-fence can also function as an electronic anchor watch, alerting the user if the anchor drags.

In exemplary embodiments, the user application 107 can also enable remote switching, giving the user an ability to control onboard systems, such as cabin and cockpit lights, air conditioning, battery switches, and more. The electronic devices 111-117 can also be configured to sound an alarm or activate a strobe light in the event there is a critical event on a boat, such as high water in the bilge or unauthorized entry. The user application 107 can also provide graphic engine alert warnings with date and time indicators, highlighting the engine performance at the time of an alert. The user application 107 can track multiple engines. The user application 107 can also provide a listed summary of alert events, along with the time and date for easy look-up. In some embodiments, the user application 107 can include graphic real time engine on/off status, graphic indicators of fuel used at RPM and total fuel used over a selectable time, instant engine data refresh, a graphic fluid level display for multi-tank fuel, water, and waste tanks. The user application 107 can also enable alert forwarding to service providers or emergency responders. Notifications and alerts provided by the user application 107 can be grouped or prioritized by boat, by fleet, by alert type, by day, or by any other desirable filter.

In some embodiments, the electronic devices 111-117 can each be installed on one or more marine vessels or boats, with each electronic device being in communication with a number of sensors 121-127 aboard their respective boats. Thus, a single user application 107 on a computing device 105 can simultaneously monitor a fleet of boats, and metrics associated with each boat within the fleet, as long as each boat includes at least one electronic device connected to the computing device 105 via the network 101. In some cases, if connection between a marine electronic device and the computing device 105 and/or server 103 fails, the connection can be restored at a later time and communications/data can be updated.

In exemplary embodiments, the electronic devices 111-117 can be in communication with the sensors 121-127 via a NMEA 200 CAN bus, or other suitable communication standard. In some embodiments, the marine electronic device can create new manufacture data channels on the marine electronic device, and the server 103 can create new data channels, for each sensor compatible with the CAN bus. This can empower NMEA device manufacturers to produce compatible devices. In some embodiments, user application 107 can also create a unique application experience on the computing device for each sensor or type of sensor compatible with the CAN bus. Example features that can be customized may include, for example, RPM, temperature, pressure, fuel consumption, etc. all of which can be plotted over a selectable time range. Example application experience elements that can be generated or customized may include automatic GUI tile generation. For example, a GUI tile may appear via the user application 107 automatically after 15 minutes of connectivity with a particular sensor or type of sensors.

Figure 2:
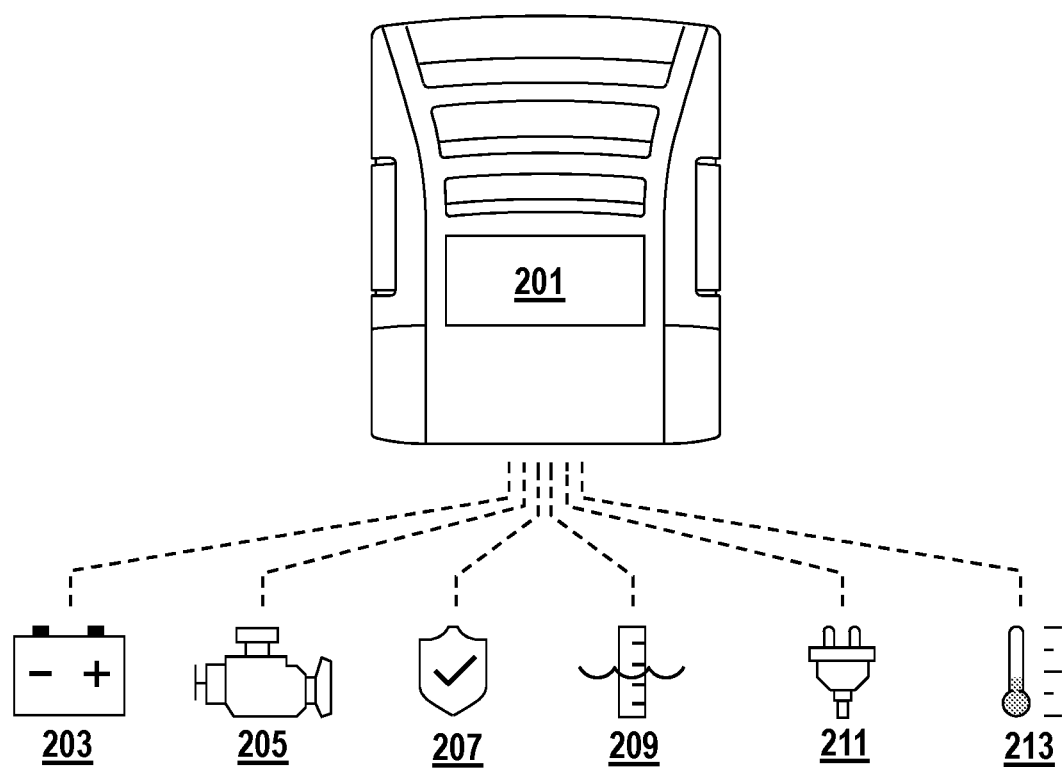
FIG. 2 illustrates an exemplary MTC architecture, according to one embodiment of the present disclosure.

FIG. 2 illustrates an exemplary MTC architecture, according to one embodiment of the present disclosure. A waterproof marine electronic device 201 is illustrated in communications with a number of marine sensors 203-213. As will be appreciated, this MTC architecture is flexible, in that multiple wired and/or wireless sensors can be added easily to a single marine electronic device 201. The example sensors shown in FIG. 2 include, but are not limited to, a battery monitoring sensor 203, engine metrics sensors 205, security sensors 207, bilge sensors 209, shore power sensors 211, and temperature sensors 218.

In exemplary embodiments, the waterproof marine electronic device 201 may be affixed to an interior of a marine vessel. In one implementation, the marine electronic device 201 includes status LEDs (e.g., GPS (green)/cellular (red)), digital inputs, remote battery control, location technology (e.g., 56 channel GPS with SBAS), analog and digital outputs, temperature sensor input, etc. The marine electronic device 201 may also include, in some embodiments, a back-up battery, cellular or satellite connectivity (e.g., an internal antenna), GPS capability, terminal connectors for wired sensors, a wireless transceiver to support wireless sensors. The marine electronic device 201 may also include one or more of an external GPS antenna and/or satellite transceiver, in some embodiments.

The marine electronic device 201 may be communicatively linked to a MTC server, which may be communicatively linked to a user computing device, as discussed above in reference to FIG. 1. In exemplary embodiments, the marine electronic device 201 includes GPS tracking and geofencing that enables the MTC user linked to an MTC server to track the location and movements of a boat, and receive alerts if it leaves or enters a designated area. Moreover, with the bread crumbing feature, the user can review a complete history of where a boat has been.

In exemplary embodiments, the battery sensor 203 can monitor various batteries onboard a boat and send alerts when batteries fail or fall below a preset level. The system may generate an alert that can be sent to a user via the computing device if a battery fails or falls below the preset level. The user application 107 discussed above in FIG. 1 can also display current battery levels and voltages, in some embodiments.

In exemplary embodiments, the marine electronic device 201 may include engine metrics sensors 205, such as, ignition or oil pressure gauges to track engine hours. The system may generate an alert that can be sent to a user via the computing device, discussed above in FIG. 1, if the ignition is switched on. The user may also receive updates or reminders when the engine has logged a certain number of hours or is due for a service.

In exemplary embodiments, the marine electronic device 201 can be in communication with one or more security sensors 207. These security sensors can detect entry or motion on a boat, or the movement of doors or other fixtures on the boat. The marine electronic device 201 can connect to a variety of boat security sensors 207, including motion sensors, magnetic switches, canvas snap sensors, pressurized mats, and more. In addition to sending an alert through a user application 107, the marine electronic device 201 can automatically trigger an audible alarm and send alerts to multiple recipients.

In exemplary embodiments, the marine electronic device 201 can be in communication with a shore power sensor 211. The system may generate an alert if the boat gets disconnected from shore power or if there is a power outage at the dock.

Figure 3A:
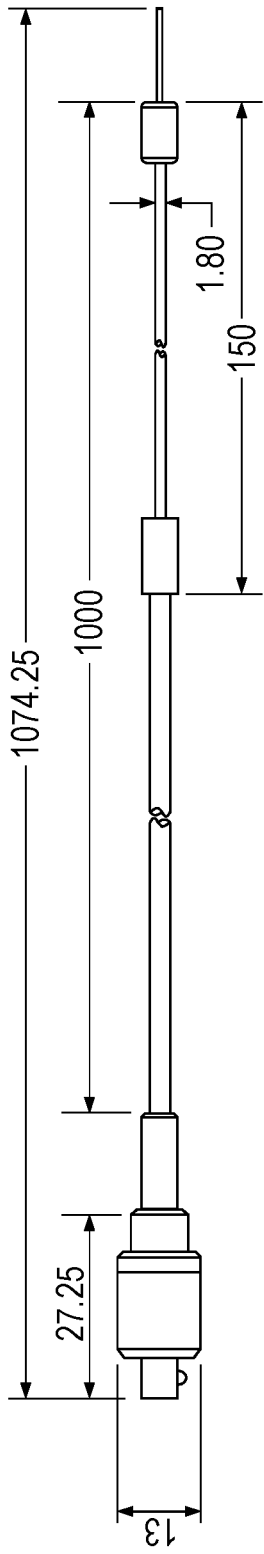
FIGS. 3A-3B illustrate an exemplary voltage tail, according to one embodiment of the present disclosure.
Figure 3B:
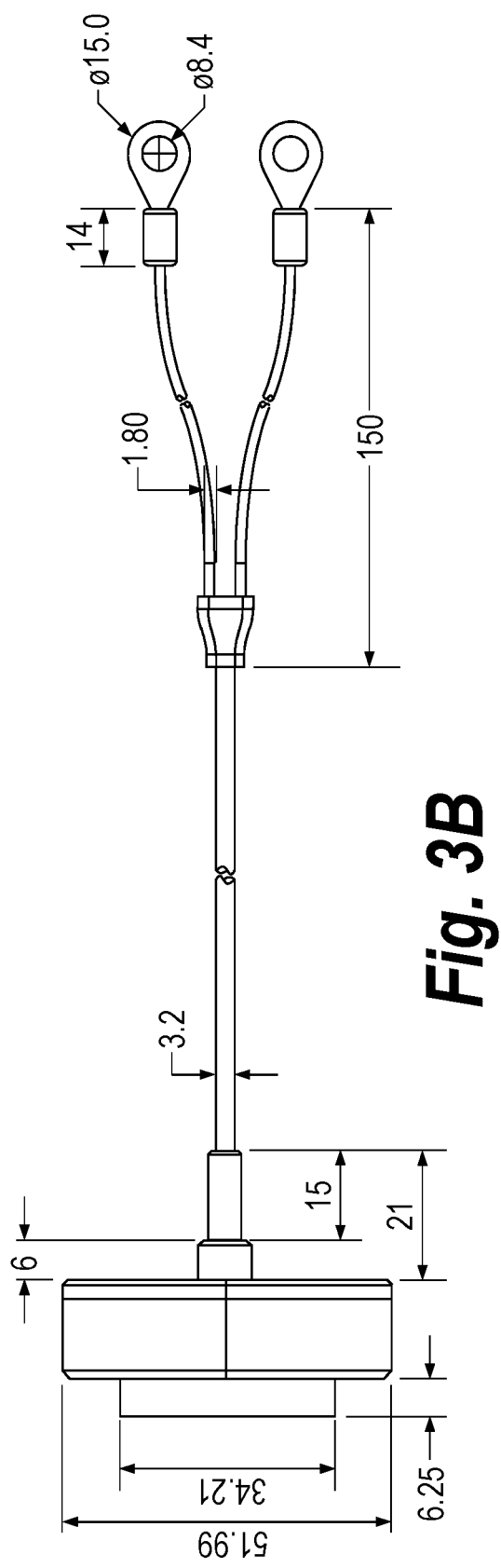

FIGS. 3A-3B illustrate an exemplary voltage tail, according to one embodiment of the present disclosure. FIG. 3A illustrates an example side view of the voltage tail, while FIG. 3B illustrates an example view from above.

Figure 4A:
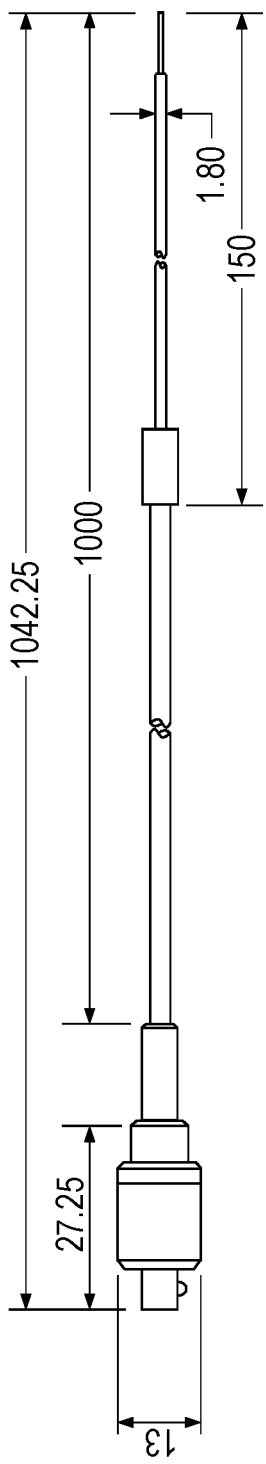
FIGS. 4A-4B illustrate an exemplary bilge pump tail, according to one embodiment of the present disclosure.
Figure 4B:
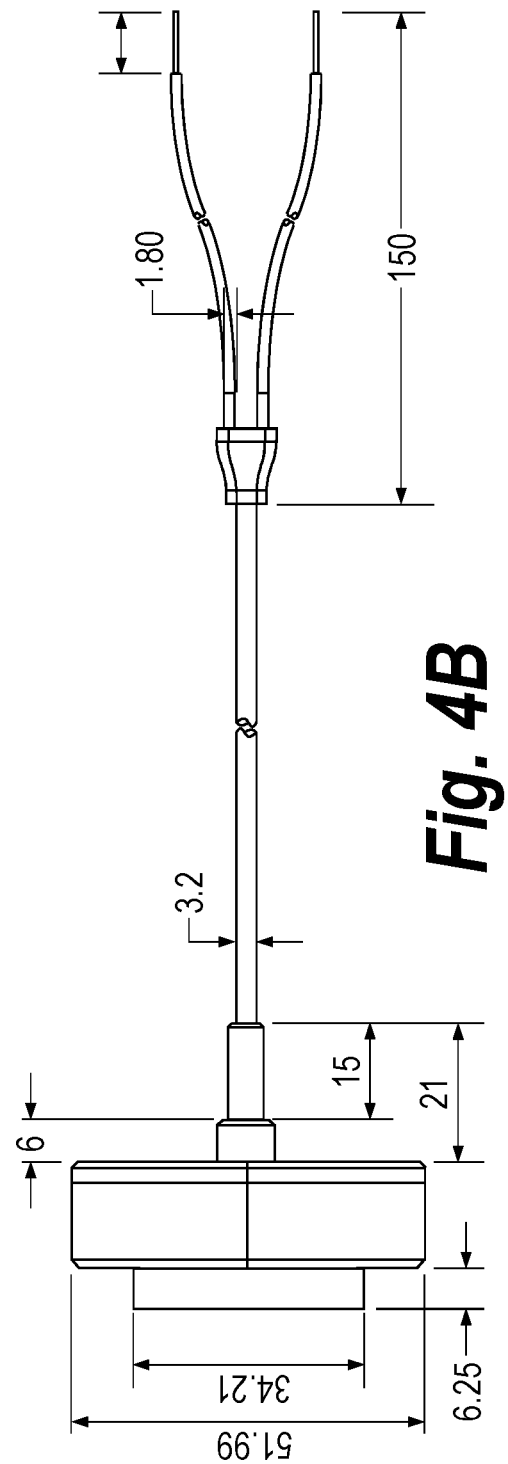

FIGS. 4A-4B illustrate an exemplary bilge pump tail, according to one embodiment of the present disclosure. The bilge pump activity and high water sensor can enable the marine electronic device 201 to know how often the bilge pump is running and if the water level has risen to a dangerous level. FIG. 4A illustrates an example side view of the bilge pump tail, while FIG. 4B illustrates a view from above. This sensor can measure the run time and daily cycles of the bilge, in some embodiments, and send notifications if the pump runs more frequently or longer than a normal amount. A normal running time of a bilge pump is approximately one minute or less. In the event that the bilge pump stops working, or water is coming in faster than can be pumped out, a high water alarm can prevent a major disaster. In addition to sending an alert to the user application 107, the sensor can be configured to automatically trigger an audible siren, strobe light, or other alarm.

FIGS. 5A-5B illustrate an exemplary temperature sensor, according to one embodiment of the present disclosure. In some embodiments, the temperature sensor can enable a user to monitor the temperature of the cabin, engine room, bait locker, or fridge. Alerts can be sent if the temperature exceeds or drops below preset levels, and temperature history reports can be viewed via the user application 107, in some embodiments.

Figure 6A:
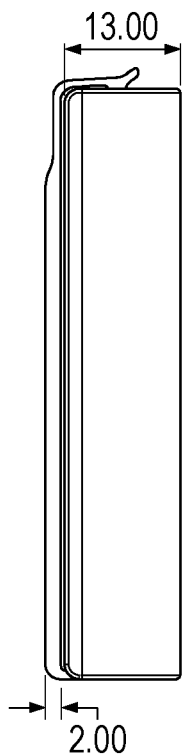
FIGS. 6A-6C illustrate exemplary dimensions of a marine electronic device, according to one embodiment of the present disclosure.
Figure 6B:
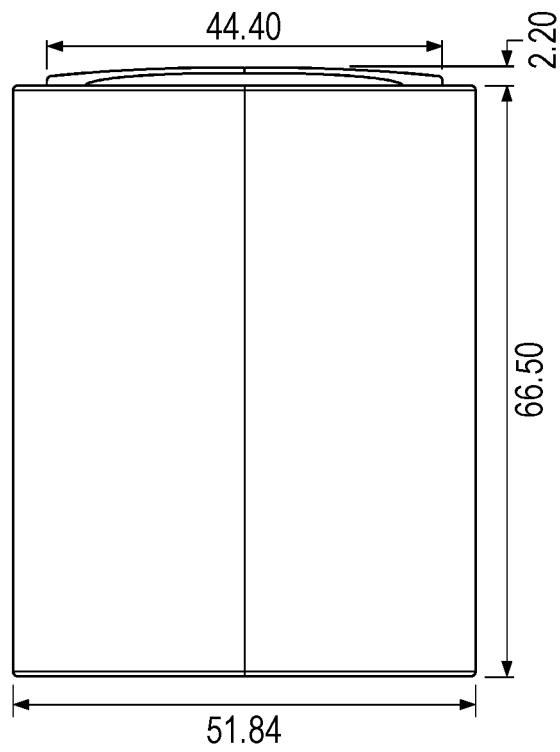
Figure 6C:
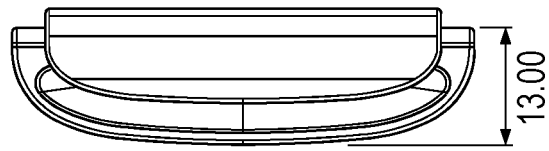

FIGS. 6A-6C illustrate exemplary dimensions of a marine electronic device, according to one embodiment of the present disclosure. The example marine electronic device shown in FIGS. 6A-6C can be similar to the one shown in FIG. 2, and can be waterproof in order to withstand marine environments. FIG. 6A shows a side view of the example device, while FIG. 6B shows a front view and FIG. 6C shows a view from above.

Figure 7A:
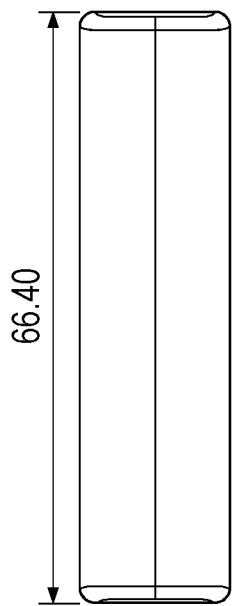
FIGS. 7A-7C illustrate exemplary dimensions of an alternative marine electronic device, according to another embodiment of the present disclosure.
Figure 7B:
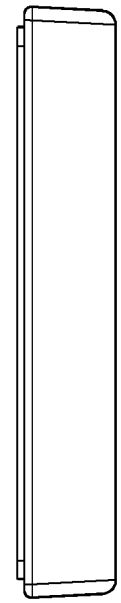
Figure 7C:
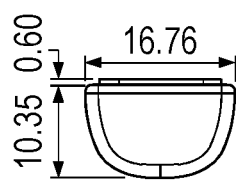

FIGS. 7A-7C illustrate exemplary dimensions of an alternative marine electronic device, according to another embodiment of the present disclosure. FIG. 7A shows a side view of the example device, while FIG. 7B shows a front view and FIG. 7C shows a view from above. The example marine electronic device shown in FIGS. 7A-7C is an alternative embodiment to the one shown in FIGS. 6A-6C with a smaller form factor.

Figure 8:
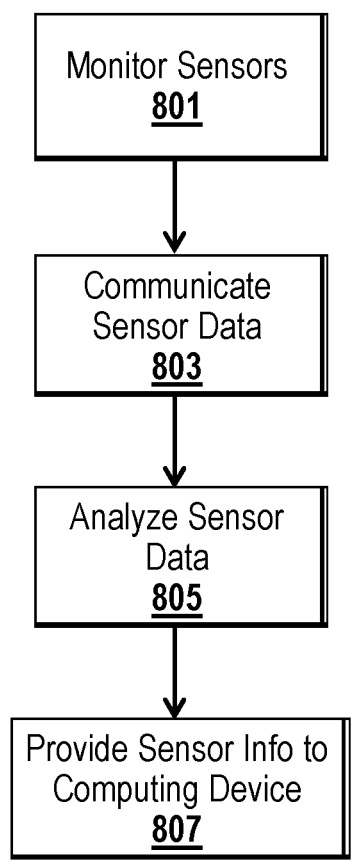
FIG. 8 is a flowchart illustrating an exemplary method for monitoring metrics associated with a marine vessel, according to an exemplary embodiment

FIG. 8 is a flowchart illustrating an exemplary method for monitoring metrics associated with a marine vessel, according to an exemplary embodiment. It will be appreciated that the method can be programmatically performed, at least in part, by one or more computer-executable processes executing on, or in communication with, one or more servers or other computing devices such as those described further below. In step 801, a marine electronic device monitors one or more sensors associate with a marine vessel. As discussed above, the marine electronic device is located at the marine vessel, and can be mounted on the interior of the vessel. The sensors can include, for example, a GPS position sensor, a geo-fence sensor, a battery monitoring sensor, an engine metrics sensor, a bilge sensor, a security sensor, a shore power sensor, a temperature sensor, or a remote switching sensor.

In step 803, the marine electronic device communicates the sensor data to a remote server that is in communication with the marine electronic device. In step 805, the remote server analyzes the sensor data. In some embodiments, the remote server can analyze data from a geo-fence sensor or a GPS position sensor in order to determine the location of the vessel. In other embodiments, the remote server can analyze bilge pump activity data in order to determine whether the bilge pump is operating longer or more frequently than average or expected.

In step 807, the remote server provides sensor information to a user computing device. The user computing device includes a user application, as discussed above, in order to provide information and receive commands from a user, and the sensor information provided by the remote server can include, for example, battery level status, engine status, alarm status, alarm history, location information, fuel level, etc.

Figure 9:
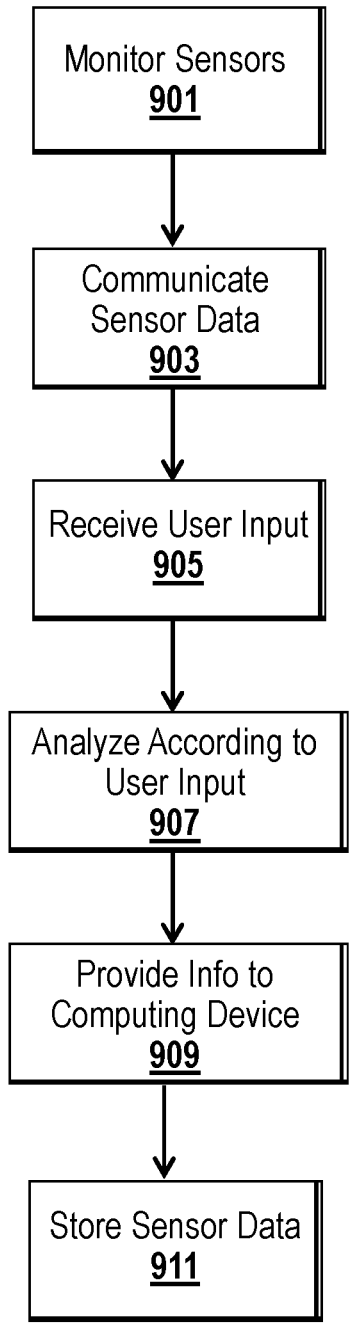
FIG. 9 is a flowchart illustrating another exemplary method for monitoring metrics associated with a marine vessel, according to an exemplary embodiment.

FIG. 9 is a flowchart illustrating another exemplary method for monitoring metrics associated with a marine vessel, according to an exemplary embodiment. It will be appreciated that the method can be programmatically performed, at least in part, by one or more computer-executable processes executing on, or in communication with, one or more servers or other computing devices such as those described further below. In step 901, a marine electronic device monitors one or more sensors associate with a marine vessel. As discussed above, the marine electronic device is located at the marine vessel, and can be mounted on the interior of the vessel. The sensors can include, for example, a GPS position sensor, a geo-fence sensor, a battery monitoring sensor, an engine metrics sensor, a bilge sensor, a security sensor, a shore power sensor, a temperature sensor, or a remote switching sensor.

In step 903, the marine electronic device communicates the sensor data to a remote server that is in communication with the marine electronic device and a user computing device. The user computing device includes a user application, as discussed above, in order to provide information and receive commands from a user. In step 905, the remote server can receive user input, such as sensor threshold values or a geo-fence location. For example, the user can provide geo-fencing information indicating that the vessel is to remain within a defined perimeter or geo-fence. In other embodiments, the user input can include an indication that the vessel engine is to remain off during predetermined time periods, or that the lights onboard the vessel should be turned on or off on according to a defined schedule. All of these user inputs or parameters can bin input by the user via a user application on the user computing device, as discussed above.

In step 907, the remote server analyzes the sensor data according to the user input received in step 905. For example, if the user has defined a geo-fence, the remote server can analyze the position information from the various sensors and determine whether the vessel has remained within the defined geo-fence. In another embodiment, if the user has defined a time period when the vessel engine should remain off, the remote server can analyze engine information from the engine metrics sensors to determine whether the user defined parameter has been followed.

In step 909, the remote server provides information to the computing device, such as an alert that the vessel has moved outside the defined geo-fence, an alert that the engine was turned on at an incorrect time, or a status update indicating that the vessel is safe and no parameters have been broken. Additional information that can be provided to the computing device include historical temperature information, battery power information, etc.

In step 911 sensor data, and any other information received or generated by the remote server, can be stored in a database. In some embodiments, the database is a remote database in communication with the remote server via a wired or wireless network.

Figure 10:
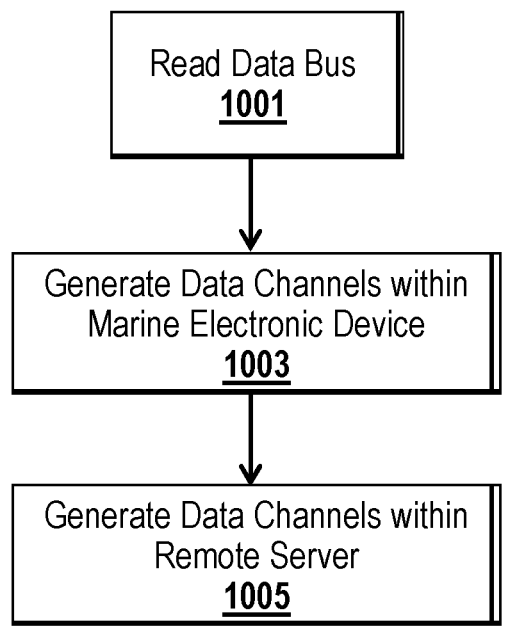
FIG. 10 is a flowchart illustrating another exemplary method for monitoring metrics associated with a marine vessel, according to an exemplary embodiment.

FIG. 10 is a flowchart illustrating another exemplary method for monitoring metrics associated with a marine vessel, according to an exemplary embodiment. It will be appreciated that the method can be programmatically performed, at least in part, by one or more computer-executable processes executing on, or in communication with, one or more servers or other computing devices such as those described further below. In step 1001, a marine electronic device reads a data bus in communication with a plurality of marine sensors. As discussed above, the sensors can include, for example, a GPS position sensor, a geo-fence sensor, a battery monitoring sensor, an engine metrics sensor, a bilge sensor, a security sensor, a shore power sensor, a temperature sensor, or a remote switching sensor. In some embodiments, the data bus is a NMEA 2000 Control Area Network (CAN) based data bus.

In step 1003, unique data channels are generated within the firmware of the marine electronic device corresponding to each sensor or type of sensors in communication with the data bus. In step 1005, unique data channels are generated within a remote server in communication with the marine electronic device corresponding to each sensor or type of sensors in communication with the data bus.

In describing example embodiments, specific terminology is used for the sake of clarity. For purposes of description, each specific term is intended to at least include all technical and functional equivalents that operate in a similar manner to accomplish a similar purpose. Additionally, in some instances where a particular example embodiment includes a plurality of system elements, device components or method steps, those elements, components or steps can be replaced with a single element, component or step. Likewise, a single element, component or step can be replaced with a plurality of elements, components or steps that serve the same purpose. Moreover, while example embodiments have been shown and described with references to particular embodiments thereof, those of ordinary skill in the art will understand that various substitutions and alterations in form and detail can be made therein without departing from the scope of the disclosure. Further still, other aspects, functions and advantages are also within the scope of the disclosure.

Example flowcharts are provided herein for illustrative purposes and are non-limiting examples of methodologies. One of ordinary skill in the art will recognize that example methodologies can include more or fewer steps than those illustrated in the example flowcharts, and that the steps in the example flowcharts can be performed in a different order than the order shown in the illustrative flowcharts.

Additionally, in some instances where a particular example embodiment includes a plurality of system elements, device components or method steps, those elements, components or steps may be replaced with a single element, component or step. Likewise, a single element, component or step may be replaced with a plurality of elements, components or steps that serve the same purpose. Moreover, while example embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the disclosure.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be examples and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that inventive embodiments may be practiced otherwise than as specifically described. Inventive embodiments of the present disclosure are directed to each individual feature, system, article, material, kit, and/or method described herein. In addition, any combination of two or more such features, systems, articles, materials, kits, and/or methodologies, if such features, systems, articles, materials, kits, and/or methodologies are not mutually inconsistent, is included within the inventive scope of the present disclosure.

Also, the technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification, unless clearly indicated to the contrary, should be understood to mean "at least one."

The phrase "and/or," as used herein in the specification, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "having," "containing," "involving," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system comprising:
    a machine type communication (MTC) server;
    a computing device in communication with the MTC server;
    a marine electronic device located at a marine vessel and in communication with the MTC server, wherein the marine electronic device is configured to connect to one or more wired or wireless marine sensors, and configured to communicate sensor data received from the one or more marine sensors to the MTC server; and
    a user application residing on the computing device, the user application configured to provide the sensor data to a user and configured to receive one or more user parameters from the user and provide the user parameters to the server,
    wherein the server is configured to analyze the sensor data and determine whether the sensor data is within the one or more user parameters, and configured to provide an alert to the user indicating that at least one of the user parameters has been exceeded or that none of the user parameters has been exceeded.

2. The system of claim 1, wherein the marine electronic device includes one or more of: a status LED, a digital input, a remote battery control, location technology, analog and digital outputs, a temperature sensor input, a back-up battery, an antenna, a GPS unit, a terminal connector for wired sensors, a wireless transceiver for wireless sensors, an external GPS antenna, or a satellite transceiver.

3. The system of claim 1, wherein the one or more wired or wireless marine sensors include one or more of: a GPS position sensor, a geo-fence sensor, a battery monitoring sensor, an engine metrics sensor, a bilge sensor, a security sensor, a shore power sensor, a temperature sensor, or a remote switching sensor.

4. The system of claim 1, wherein the user application residing on the computing device is configured to receive user input including geo-fencing parameters and security parameters.

5. The system of claim 1, wherein the user application residing on the computing device is configured to transmit an alert to a user if the marine vessel enters or leaves a designated area.

6. The system of claim 1, wherein the marine electronic device is configured to track a location of the marine vessel, and the user application residing on the computing device is configured to transmit an alert to a user if the anchor drags.

7. The system of claim 1, wherein the one or more wired or wireless marine sensors include a bilge sensor configured to monitor bilge pump activity and bilge water level.

8. The system of claim 7, wherein the user application residing on the computing device is configured to transmit an alert to a user if the bilge pump runs more frequently or longer than average.

9. A method of monitoring metrics associated with a marine vessel comprising:
    monitoring, using a marine electronic device located at a marine vessel, one or more marine sensors associated with the marine vessel;
    communicating sensor data received from the one or more marine sensors from the marine electronic device to a remote server;
    analyzing the sensor data at the remote server;
    transmitting marine sensor information from the remote server to a computing device in communication with the remote server, the computing device including a user application configured to provide the marine sensor information to a user, to provide the sensor data to a user, to receive one or more user parameters from the user and to provide the user parameters to the remote server,
    wherein the remote server is configured to analyze the sensor data and determine whether the sensor data is within the one or more user parameters, and configured to provide an alert to the user indicating that at least one of the user parameters has been exceeded or that none of the user parameters has been exceeded.

10. The method of claim 9, wherein the marine sensor information includes a notification regarding one or more of the following metrics: rotations per minute, temperature, pressure, fuel consumption, summary of alerts, alert history, fuel level, water level, bilge level, bilge pump activity, battery level, vessel security, and vessel location.

11. The method of claim 9, wherein the user parameters include a geo-fence, marine sensor threshold values, marine vessel itineraries, and security parameters.

12. The method of claim 11, wherein the remote server is further configured to analyze the sensor data according to the user-provided parameters; and the user application is configured to generate a notification if the sensor data does not conform to the user-provided parameters.

13. The method of claim 9 further comprising:
    reading a data bus, by a marine electronic device, wherein the data bus is in communication with a plurality of marine sensors;
    generating unique data channels within a firmware of the marine electronic device corresponding to each sensor or type of sensors in communication with the data bus; and generating unique data channels within a remote server in communication with the marine electronic device corresponding to each sensor or type of sensors in communication with the data bus.

14. The method of claim 13, wherein the data bus is an NMEA 2000 Control Area Network (CAN) based data bus.

15. The method of claim 13, further comprising: generating unique application experiences, via a user application residing on a computing device in communication with the remote server, wherein the unique application experiences correspond to each sensor or type of sensors in communication with the data bus.

16. The method of claim 13, wherein the user application is configured to provide to a user, via a graphical user interface (GUI), indicators related to one or more of the following metrics: rotations per minute, temperature, pressure, fuel consumption, summary of alerts, alert history, fuel level, water level, bilge level, bilge pump activity, battery level, vessel security, and vessel location.

17. A marine electronic device comprising:
a main circuit board;
a status LED;
a digital input; and
a remote battery control, wherein the marine electronic device is configured to be in communication with an MTC server, to connect to one or more wired or wireless marine sensors, and to communicate sensor data received from one or more marine sensors to the MTC server, wherein the MTC server is configured to analyze the sensor data and determine whether the sensor data is within one or more user parameters input by a user, and configured to provide an alert to the user indicating that at least one of the user parameters has been exceeded or that none of the user parameters has been exceeded.

18. The marine electronic device of claim 17 further comprising: location technology; analog and digital outputs; and a temperature sensor input.

19. The marine electronic device of claim 18 further comprising: a back-up battery; an antenna; and a GPS unit.

20. The marine electronic device of claim 19 further comprising: a terminal connector for wired sensors; and a wireless transceiver to support sensors.

21. The marine electronic device of claim 20 further comprising: an external GPS antenna; and a satellite transceiver.

22. A system comprising:
a machine type communication (MTC) server;
a computing device in communication with the MTC server;
a plurality of marine electronic devices located in a plurality of marine vessels, the plurality of marine electronic devices being in communication with the MTC server, wherein each of the marine electronic devices is configured to connect to one or more wired or wireless marine sensors located at a corresponding one of the plurality of marine vessels, and configured to communicate sensor data received from the one or more marine sensors to the MTC server; and
a user application residing on the computing device, the user application configured to provide the sensor data to a user so that the user application can monitor the sensors on the plurality of marine vessels.

* * * * *